United States Patent
Iguchi et al.

(10) Patent No.: US 11,823,841 B2
(45) Date of Patent: Nov. 21, 2023

(54) CERAMIC ELECTRONIC DEVICE

(71) Applicant: TDK CORPORATION, Tokyo (JP)

(72) Inventors: Toshihiro Iguchi, Tokyo (JP); Yuichiro Sueda, Tokyo (JP); Ryota Namiki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 37 days.

(21) Appl. No.: 17/683,645

(22) Filed: Mar. 1, 2022

(65) Prior Publication Data
US 2022/0285097 A1    Sep. 8, 2022

(30) Foreign Application Priority Data

Mar. 8, 2021 (JP) ................................ 2021-036614

(51) Int. Cl.
| | |
|---|---|
| *H01G 4/232* | (2006.01) |
| *H01G 4/30* | (2006.01) |
| *H01G 4/12* | (2006.01) |
| *H01G 4/248* | (2006.01) |

(52) U.S. Cl.
CPC ......... *H01G 4/2325* (2013.01); *H01G 4/1209* (2013.01); *H01G 4/248* (2013.01); *H01G 4/30* (2013.01)

(58) Field of Classification Search
CPC .... H01G 4/2325; H01G 4/1209; H01G 4/248; H01G 4/30; H01G 4/012; H01G 4/1227; H01G 4/0085; H01G 4/1236
See application file for complete search history.

(56) References Cited

U.S. PATENT DOCUMENTS

| | | | | |
|---|---|---|---|---|
| 5,536,293 | A * | 7/1996 | Yamamoto | C03C 8/18 252/519.54 |
| 10,008,326 | B2 * | 6/2018 | Koga | H01G 4/1227 |
| 10,861,649 | B2 * | 12/2020 | Nakamura | C04B 35/16 |
| 2009/0290281 | A1 * | 11/2009 | Nagamoto | H01G 4/2325 29/25.42 |
| 2012/0057272 | A1 * | 3/2012 | Hirata | H01G 4/1236 361/321.4 |
| 2016/0104578 | A1 * | 4/2016 | Kang | H01G 4/2325 361/301.4 |
| 2020/0115275 | A1 * | 4/2020 | Awagakubo | H01B 1/22 |

(Continued)

FOREIGN PATENT DOCUMENTS

JP        H04-171912 A        6/1992

*Primary Examiner* — Dion R. Ferguson
(74) *Attorney, Agent, or Firm* — Oliff PLC

(57) ABSTRACT

A ceramic electronic device includes an element body and an external electrode. The element body includes a ceramic layer and an internal electrode layer. The external electrode is formed on an end surface of the element body and electrically connected to a part of the internal electrode layer. The ceramic layer includes a perovskite compound represented by $ABO_3$ as a main component. The external electrode includes a baked electrode layer having a first region and a second region. The first region is contacted with the end surface of the element body and located near a joint boundary with the element body. The second region is located outside the first region and constitutes an outer surface of the baked electrode layer. The first region includes a glass frit including at least B, Zn, and Si. The second region includes an oxide having a higher melting point than Cu.

8 Claims, 4 Drawing Sheets

(56) References Cited

U.S. PATENT DOCUMENTS

| | | | |
|---|---|---|---|
| 2020/0126723 A1* | 4/2020 | Ooe | H01G 4/30 |
| 2021/0323859 A1* | 10/2021 | Tateno | C03C 8/18 |
| 2022/0285097 A1* | 9/2022 | Iguchi | H01G 4/2325 |
| 2022/0293344 A1* | 9/2022 | Iguchi | H01G 4/1227 |

* cited by examiner

CERAMIC ELECTRONIC DEVICE

BACKGROUND OF THE INVENTION

The present invention relates to a ceramic electronic device including an external electrode.

As shown in Patent Document 1, a ceramic electronic device including an element body containing a ceramic component and external electrodes formed on an outer surface of the element body is known. Baked electrodes are widely used as external electrodes for ceramic electronic devices, and the baked electrodes can be formed by applying a conductive paste containing conductor powder and glass frit to the surface of the element body and baking it. In Patent Document 1, the solder wettability of the external electrode is improved by forming a plating electrode on the baked electrode as mentioned above.

However, the external electrodes disclosed in Patent Document 1 may have plating defects. Specifically, glass frits are contained in the baked electrode and may be exposed to the outer surface of the baked electrode, and plating defects, such as adhesion failure of the plating electrode and undeposition, may occur. For the prevention of such plating defects, it is conceivable to reduce the amount of glass frits in the baked electrode. If the amount of glass frits is reduced, however, the joint strength of the baked electrode to the surface of the element body decreases, and the baked electrode may peel off from the surface of the element body.

Accordingly, it is difficult for the prior arts as shown in Patent Document 1 to achieve both of the plating property of the baked electrode (ease of forming the plating electrode) and the joint strength to the element body.

Patent Document 1: JPH04171912 (A)

BRIEF SUMMARY OF THE INVENTION

The present invention has been achieved under such circumstances. It is an object of the present invention to provide a ceramic electronic device including a baked electrode having a favorable plating property and a high joint reliability to an element body.

To achieve the above object, a ceramic electronic device according to the present invention comprises:
an element body including a ceramic layer and an internal electrode layer; and
an external electrode formed on an end surface of the element body and electrically connected to at least one end of the internal electrode layer,
wherein
the ceramic layer comprises a perovskite compound represented by $ABO_3$ as a main component,
the external electrode comprises a baked electrode layer,
the baked electrode layer comprises:
  a first region contacted with the end surface of the element body and located near a joint boundary with the element body; and
  a second region located outside the first region and constituting an outer surface of the baked electrode layer,
the first region comprises a glass frit including at least B, Zn, and Si, and
the second region comprises an oxide having a higher melting point than Cu.

The present inventors have found that the ceramic electronic device having the above-mentioned configurations improves the plating property of the baked electrode and the joint reliability of the external electrode (baked electrode) to the element body. The reason why the above-mentioned effect is obtained is not necessarily clear, but the following reasons can be considered.

First, as described above, in the ceramic electronic device according to the present invention, the second region including a high-melting-point oxide is present on the outer surface of the baked electrode layer to be contacted with a plating electrode. Since a predetermined high-melting-point oxide is present near the outer surface, it is considered to be able to prevent the deposition of non-metal components, such as glass frits, on the outer surface of the baked electrode layer. As a result, the generation of plating defects can be prevented in the formation of the plating electrode on the baked electrode.

In the ceramic electronic device according to the present invention, the glass frit including predetermined elements is contained in the first region bonded with the end surface of the element body. The glass frit is considered to spread wet in the conductor and between the conductor and the end surface of the element body and improve the joint strength of the baked electrode layer to the element body. As a result, the ceramic electronic device according to the present invention can prevent the external electrode from peeling from the end surface of the element body even if receiving a thermal shock.

In particular, when the glass frit of the first region or the oxide of the second region satisfies a predetermined composition ratio, the plating property and the joint reliability of the external electrode (baked electrode layer) are further improved.

That is, preferably, the glass frit contained in the first region comprises: a Zn content of 0.20 parts by mol to 0.35 parts by mol; a Si content of 0.10 parts by mol to 0.30 parts by mol; and a remainder of B, provided that a total of the B content, the Zn content, and the Si content is 1 part by mol.

Preferably, the oxide contained in the second region includes Zn and Si as a main component, and a molar ratio (Zn/Si) of a Zn content to a Si content in the oxide is 1.5 to 2.4.

Instead, preferably, the oxide contained in the second region is $Zn_2SiO_4$.

Preferably, a boundary layer is present at an end of the ceramic layer to be contacted with the external electrode on the end surface of the element body, and the boundary layer includes Zn, Si, and an A-site element of the perovskite compound.

As mentioned above, the boundary layer containing predetermined elements is present at an end of the ceramic layer, and the joint reliability of the baked electrode to the element body is further improved. The reason why the joint reliability is further improved is not necessarily clear, but the mutual diffusion phenomenon is considered to be related. Specifically, common elements (Zn, Si, and A-site element) between the external electrode (particularly, the glass frit) and the element body (particularly, the boundary layer and the ceramic layer) or elements that are easily solid-soluted in both of them are diffused to each other between the external electrode and the element body, and the joint strength of the external electrode is thereby considered to be further improved.

Moreover, when the above-mentioned boundary layer satisfies a predetermined composition, the joint strength of the external electrode is further improved. That is, the boundary layer comprises: an A-site element content of 0.3 parts by mol to 0.45 parts by mol; a Zn content of 0.15 parts by mol to 0.45 parts by mol; and a remainder of Si, provided that a total of the Zn content, the Si content, and the A-site element content is 1 part by mol. Instead, preferably, a main component of the boundary layer is $(Ca,Sr)_2Zn(Si_2O_7)$.

Preferably, an area ratio of a conductor in the first region is 30% to 60% in a cross section of the baked electrode layer. When the baked electrode layer satisfies the above-mentioned requirement, the joint strength of the external electrode is further improved.

Preferably, an area ratio of a conductor in the second region is 70% to 90% in a cross section of the baked electrode layer. When the baked electrode layer satisfies the above-mentioned requirement, the plating property of the external electrode is further improved.

BRIEF DESCRIPTION OF THE DRAWING(S)

DETAILED DESCRIPTION OF THE INVENTION

Hereinafter, the present invention is explained in detail based on embodiments shown in the figures.

First Embodiment

Figure 1A:
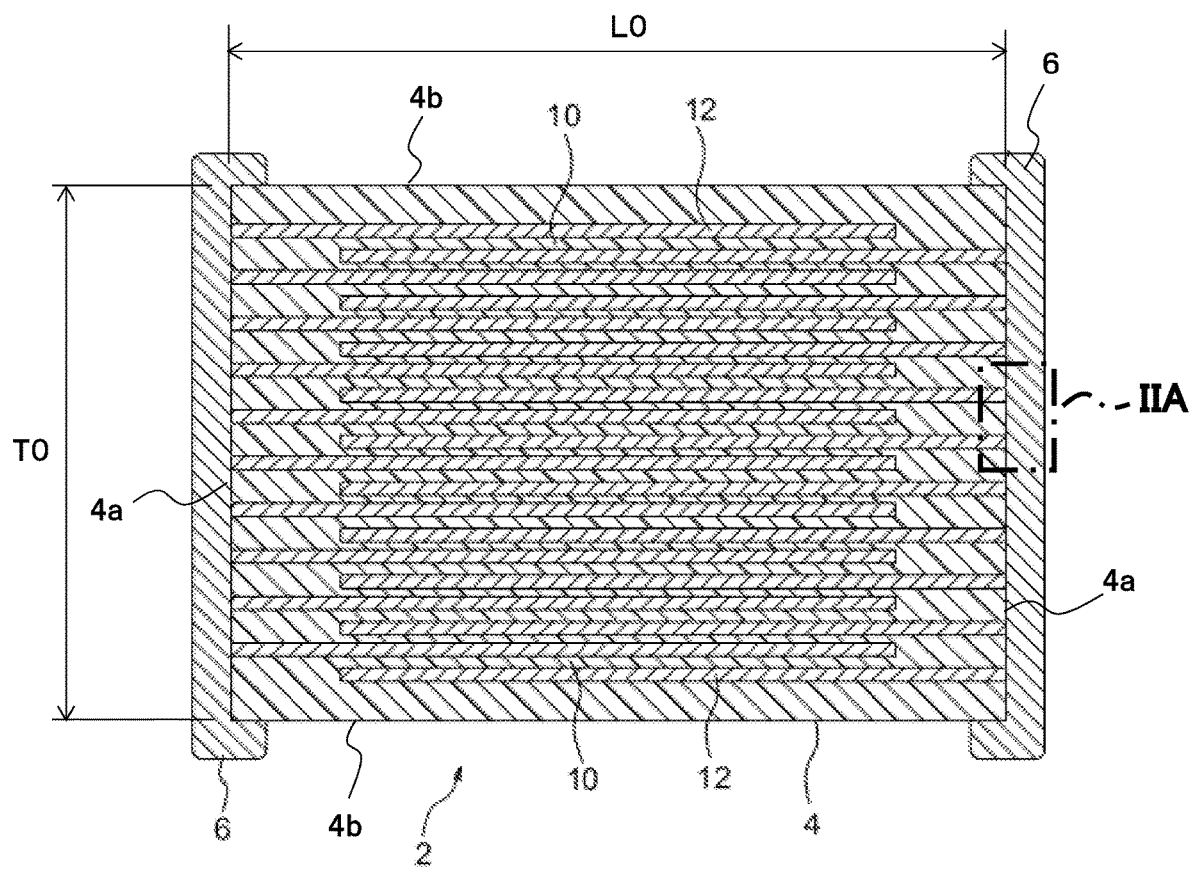
FIG. 1A is a cross-sectional view illustrating a multilayer ceramic capacitor according to an embodiment of the present invention.

In the present embodiment, a multilayer ceramic capacitor 2 shown in FIG. 1A is described as a ceramic electronic device according to the present invention. The multilayer ceramic capacitor 2 includes an element body 4 and a pair of external electrodes 6 formed on the external surface of the element body 4.

The element body 4 shown in FIG. 1A normally has a substantially rectangular parallelepiped shape and includes two end surfaces 4a facing each other in the X-axis direction, two side surfaces 4b facing each other in the Y-axis direction, and two side surfaces 4b facing each other in the Z-axis direction, but the element body 4 may have any other shape, such as elliptical columnar shape, columnar shape, and prismatic shape. The element body 4 has any outer size and can have, for example, a length L0 of 0.4-5.7 mm in the X-axis direction, a width W0 of 0.2-5.0 mm in the Y-axis direction, and a height T0 of 0.2-3.0 mm in the Z-axis direction.

In the present embodiment, the X-axis, the Y-axis, and the Z-axis are perpendicular to each other. In the present embodiment, the "inner side" means the side closer to the center of the multilayer ceramic capacitor 2, and the "outer side" means the side farther from the center of the multilayer ceramic capacitor 2.

The element body 4 includes ceramic layers 10 and internal electrode layers 12 substantially parallel to the plane including the X-axis and the Y-axis. In the inside of the element body 4, the ceramic layers 10 and the internal electrode layers 12 are laminated alternately along the Z-axis direction. Here, "substantially parallel" means that most parts are parallel, but there may be a part that is not slightly parallel, and the ceramic layers 10 and the internal electrode layers 12 may slightly be uneven or inclined.

The ceramic layers 10 include a perovskite compound represented by $ABO_3$ as a main component. Here, the main component of the ceramic layers 10 is a component contained by 80 mol % or more to the entire ceramic layers 10. In the present embodiment, preferably, the perovskite compound includes at least Ca and Sr in the A-site. In particular, among perovskite compounds, calcium zirconate strontium (CSZ) is more preferably a main component of the ceramic layers 10.

Calcium zirconate strontium can normally be represented by a composition formula of $(Ca_{(1-x)}Sr_x)m(Zr_{(1-y-z)}Ti_yHf_z)O_3$. In the composition formula, each of x, y, z, and m is an elemental ratio, and each elemental ratio is not limited and can be determined within a known range.

For example, "m" indicates an elemental ratio of the A-site to the B-site and can normally be 0.9-1.1. "x" indicates an elemental ratio of Sr in the A-site, and $0 \leq x \leq 1$ can be satisfied. That is, the ratio between Ca and Sr is determined freely, and only either of them may be contained. A trace amount of Ba may be contained in the A-site. "y" indicates an elemental ratio of Ti in the B-site, and "z" indicates an elemental ratio of Hf in the B-site. In the present embodiment, preferably, $0 \leq y+z \leq 0.1$ is satisfied. The elemental ratio of oxygen (O) in the above-mentioned composition formula may slightly deviate from the stoichiometric composition.

In addition to the above-mentioned main component, the ceramic layers 10 may include one or more sub-components, such as Mn compounds, Si compounds, Al compounds, Mg compounds, Li compounds, and B compounds. There is no limit to the type, combination, or addition amount of the sub-components.

The average thickness Td (interlayer thickness) per layer of the ceramic layers 10 is not limited and can be, for example, 100 μm or less (preferably, 30 μm or less). The lamination number of ceramic layers 10 is determined based on desired characteristics and is not limited. For example, the lamination number of ceramic layers 10 is preferably 20 or more and is more preferably 50 or more.

Meanwhile, the internal electrode layers 12 are laminated between the ceramic layers 10. The lamination number of internal electrode layers 12 is determined based on lamination number of ceramic layers 10. The average thickness Te of the internal electrode layers 12 per layer is not limited and is preferably, for example, 3.0 μm or less.

The internal electrode layers 12 are laminated so that their ends on one side are alternately exposed to the two end surfaces 4a of the element body 4 facing each other in the X-axis direction. Then, each of the pair of external electrodes 6 is formed on one end surface 4a of the element body 4 and is electrically connected to the exposed ends of the internal electrode layers 12 alternately arranged. Since the internal electrode layers 12 and the external electrodes 6 are formed in such a manner, a capacitor circuit with the external electrodes 6 and the internal electrode layers 12 is formed.

That is, the internal electrode layers 12 function as a part of the capacitor circuit to apply voltage to each of the ceramic layers 10. Thus, the internal electrode layers 12 are made of a conductive material, such as Cu, Ni, Ag, Pd, Au, Pt, and an alloy containing at least one of these metal elements. Preferably, the conductive material contained in the internal electrode layers 12 is Ni or a Ni based alloy because the constituent material of the ceramic layers 10 has reduction resistance. When Ni or a Ni based alloy is the main component, one or more sub-components for internal electrodes selected from Mn, Cu, Cr, etc. may be contained.

In addition to the above-mentioned conductive material, the internal electrode layers 12 may contain a ceramic component contained in the ceramic layers 10 as an inhibitor and may contain a trace amount of non-metal components, such as S and P (e.g., about 0.1 mass % or less).

As shown in FIG. 1A, each of the external electrodes 6 according to the present embodiment integrally includes an end surface part formed on the end surface 4*a* of the element body 4 and extension parts formed at an end in the X-axis direction on each of the side surfaces 4*b* of the element body 4. That is, each of the external electrodes 6 is formed so as to range from the end surface 4*a* to a part of the side surfaces 4*b* of the element body 4. The external electrodes 6 are insulated so as not to contact with each other in the X-axis direction.

In the present embodiment, as mentioned above, the extension parts of the external electrodes 6 are formed on the four side surfaces 4*b* of the element body 4. However, the extension parts of the external electrodes 6 are not necessarily formed, and each of the external electrodes 6 may be formed from only the end surface part. Instead, when the multilayer ceramic capacitor 2 is surface-mounted on a substrate, the extension parts of the external electrodes 6 are formed at least on the side surface 4*b* facing a mounting surface of the substrate and are not necessarily formed on the side surface 4*b* opposite to the mounting surface.

Figure 2A:
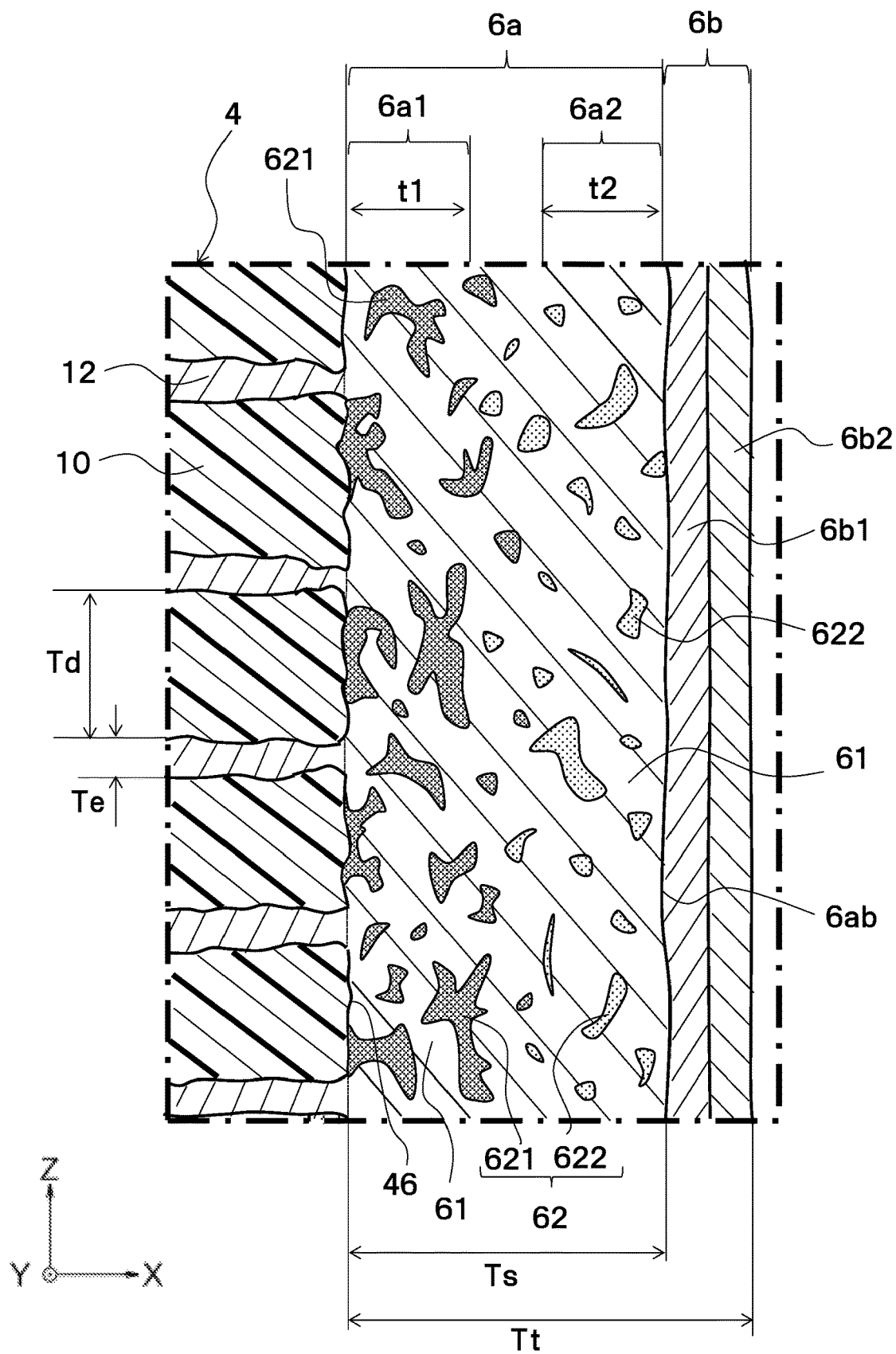
FIG. 2A is an enlarged cross-sectional view of a main part of the region IIA shown in FIG. 1A.

FIG. 2A is an enlarged schematic cross-sectional view of a joint boundary 46 between the external electrode 6 and the element body 4. FIG. 2A illustrates one of the pair of external electrodes 6, but the other external electrode 6 has the same characteristics as the external electrode 6 shown in FIG. 2A. Hereinafter, the detailed characteristics of the external electrodes 6 and the joint state between the external electrodes 6 and the element body 4 according to the present embodiment are explained based on FIG. 2A.

As shown in FIG. 2A, the external electrode 6 includes a baked electrode layer 6*a* including a conductor 61 and non-metal components 62, and the baked electrode layer 6*a* is in contact with the external surface (end surface 4*a*) of the element body 4. The external electrode 6 may be configured by a single electrode layer or may be configured by laminating a plurality of electrode layers. Preferably, as shown in FIG. 2A, the external electrode 6 includes a plating electrode layer 6*b*. When the plating electrode layer 6*b* is formed, the solder wettability of the external electrode 6 is favorable.

When the external electrode 6 is configured by a plurality of electrode layers, the baked electrode layer 6*a* is formed so as to be in contact with the external surface of the element body 4, and another baked electrode layer, a resin electrode layer, a plating electrode layer, or the like is formed on the baked electrode layer 6*a*. FIG. 2A exemplifies the external electrode 6 having a triple-layer structure of the baked electrode layer 6*a*—a Ni plating layer 6*b*1—a Sn plating layer 6*b*2 (laminated in this order).

The average thickness Ts of the baked electrode layer 6*a* in contact with the end surface 4*a* can be 5-200 μm and is preferably 10-50 μm. When the external electrode 6 is configured by a plurality of layers, the average thickness Tt of the external electrode 6 can be about 5-300 μm and is preferably 100 μm or less.

In the present embodiment, the baked electrode layer 6*a* is divided into at least two regions and includes a first region 6*a*1 and a second region 6*a*2.

The first region 6*a*1 is contacted with the end surface 4*a* of the element body 4 and located near the joint boundary 46 with the element body 4. Specifically, the first region 6*a*1 is within a predetermined distance t1 from the joint boundary 46 toward the outer side in the X-axis direction, and the predetermined distance t1 is preferably ¼ to ¾ of an average thickness Ts of the baked electrode layer 6*a* (i.e., ¼≤t1/Ts≤¾).

Meanwhile, the second region 6*a*2 is located outside the first region 6*a*1 and constitutes an outer surface 6*ab* of the baked electrode layer 6*a*. Specifically, the second region 6*a*2 is within a predetermined distance t2 from the outer surface 6*ab* toward the inner side in the X-axis direction, and the predetermined distance t2 is preferably ¼ to ¾ of an average thickness Ts of the baked electrode layer 6*a* (i.e., ¼≤t2/Ts≤¾). That is, the second region 6*a*2 is an outer-surface neighborhood region in contact with the plating electrode layer 6*b*.

The first region 6*a*1 and the second region 6*a*2 are determined in the following manner. That is, in a cross section of the baked electrode layer 6*a* as shown in FIG. 2A, a virtual line substantially parallel to the X-axis (substantially perpendicular to the end surface 4*a*) is drawn. Then, the first region 6*a*1 is defined within the predetermined distance t1, and the second region 6*a*2 is defined within the predetermined distance t2, along the virtual line.

Each of the first region 6*a*1 and the second region 6*a*2 is a part of the baked electrode layer 6*a* and includes the conductor 61 and the non-metal components 62 diffused in the conductor 61, but the first region 6*a*1 and the second region 6*a*2 have differences in the structure of the non-metal components 62, the content ratio of the conductor 61, and the like. Hereinafter, the characteristics of the first region 6*a*1 and the second region 6*a*2 are explained in detail.

The first region 6*a*1 includes glass frits 621 as the non-metal components 62, and the glass frits 621 are diffused in the conductor 61. In addition to the glass frits 621, the non-metal components 62 of the first region 6*a*1 may also include voids, oxide particles, and the like (not shown).

The glass frits 621 are an amorphous glass including at least B, Zn, and Si, and the softening temperature of the glass frits 621 is lower than the melting point of the conductor 61. The inclusion of the glass frits 621 in the first region 6*a*1 in contact with the joint boundary 46 improves the sinterability and the joint strength of the baked electrode layer 6*a*. In the formation of the baked electrode layer 6*a*, the glass frits 621 are considered to soften, enter the gaps inside the baked electrode layer 6*a* and a part of the joint boundary 46, and function to enhance the bonding of the metal powder (raw material powder of the conductor 61) and the bonding of the baked electrode layer 6*a* to the element body 4.

Preferably, the glass frits 621 satisfy the following composition ratio. That is, the Zn content is preferably 0.20 parts by mol to 0.35 parts by mol, the Si content is preferably 0.10 parts by mol to 0.30 parts by mol, and the remainder is B (preferably, the B content is 0.40 parts by mol to 0.70 parts by mol), provided that a total of the B content, the Zn content, and the Si content is 1 part by mol. When the glass frits 621 satisfy the above-mentioned composition ratio, the joint strength of the baked electrode layer 6*a* to the element body 4 is further improved.

The above-mentioned three elements (B, Zn, and Si) are main elements of the glass frits 621. The total amount of the three elements other than oxygen in the glass frits 621 is preferably 50 mol % or more and is more preferably 70 mol % to 80 mol %. In addition to the above-mentioned main elements, the glass frits 621 preferably contain an A-site element constituting the perovskite compound of the ceramic layers 10 and more preferably contain Ca and/or Sr. The inclusion of the A-site element, such as Ca and Sr, in the glass frits 621 tends to further improve the joint strength of the baked electrode layer 6a.

The amount of the A-site element, such as Ca and Sr, in the glass frits 621 is preferably 0.01 parts by mol to 0.2 parts by mol and is more preferably 0.05 parts by mol to 0.2 parts by mol, provided that the total amount of the main elements is 1.0 part by mol. The glass frits 621 may further include Al, Y, Zr, Mn, Mg, Ti, K, Na, Ba, etc.

Meanwhile, the second region 6a2 includes high-melting-point oxides 622 having a higher melting point than Cu as the non-metal components 62 and may further include voids, oxide particles, and the like (not shown). Here, the melting point in the present embodiment means a temperature at which the oxide begins to melt and is a solidus temperature in phase diagram.

In the present embodiment, the melting point of the conductor 61 is higher than a softening temperature of the glass frits 621, and the melting point of the high-melting-point oxides 622 is higher than the melting point of the conductor 61. The inclusion of the high-melting-point oxides 622 in the second region 6a2 in contact with the plating electrode layer 6b prevents undeposition, adhesion failure of the plating electrode layer 6b, and the like. This is probably because the deposition of the glass component on the outer surface 6ab is prevented by the high-melting-point oxides 622.

The high-melting-point oxides 622 preferably include Zn and Si as a main component and more preferably satisfies the following composition ratio. That is, more preferably, a molar ratio (Zn/Si) of a Zn content to a Si content in the high-melting-point oxides 622 is 1.5 to 2.4. Specifically, the high-melting-point oxides 622 are preferably $Zn_2SiO_4$.

The high-melting-point oxides 622 satisfying the above-mentioned composition are easily bonded with the glass frits 621 and contribute to improvement in sinterability and joint strength of the baked electrode layer 6a. Moreover, the high-melting-point oxides 622 satisfying the above-mentioned composition are considered to be unlikely to cause composition fluctuation even if bonded with the glass frits 621. That is, when the high-melting-point oxides 622 have a predetermined composition, it is considered that the high-melting-point oxides 622 can be prevented from chemically reacting with the glass frits 621 so as to vitrify or have a lower melting point. As a result, it is possible to more effectively prevent the deposition of the glass component on the outer surface 6ab of the baked electrode layer 6a, and the plating property of the baked electrode layer 6a is further improved.

The high-melting-point oxides 622 may be present not only in the second region 6a2, but also in the first region 6a1. Likewise, the glass frits 621 may also be present inside the second region 6a2. In particular, the glass frits 621 and the high-melting-point oxides 622 may co-exist between the first region 6a1 and the second region 6a2.

Preferably, however, the glass frits 621 are not substantially exposed to the outer surface 6ab. In other words, preferably, the glass frits 621 are not substantially contacted with the plating electrode layer 6b. Specifically, preferably, in a cross section of the baked electrode layer 6a as shown in FIG. 2A, the contact points of the glass frits 621 to the baked electrode layer 6a is three points or less/100 μm.

The number of contact points mentioned above can be measured by counting the number of contact points contained in the length of 100 μm of the outer surface 6ab in a cross-sectional observation photographed by SEM or so. The length of the outer surface 6ab means a length of a boundary line between the baked electrode layer 6a and the plating electrode layer 6b, and this boundary line may be meandering or partially unclear. When the number of contact points is counted, it is not necessary to accurately measure the meandering points, unclear points, or the like of the boundary line. The cross-sectional photograph is taken so that the boundary line (outer surface 6ab) and one side of the cross-sectional photograph are substantially parallel to each other, and the width of the cross-sectional photograph is regarded as a length of the boundary line (length of the outer surface 6ab).

The conductor 61 of the first region 6a1 and the conductor 61 of the second region 6a2 may have different compositions, but preferably have the common composition. The conductor 61 of the baked electrode layer 6a is Cu or a Cu alloy. When the conductor 61 of the baked electrode layer 6a is a Cu alloy, the conductor 61 may include one or more elements, such as Al, Ni, Ag, Pd, Sn, Zn, P, Fe, and Mn, in addition to Cu. Preferably, the amount of elements other than Cu is 5 parts by mol or less with respect to 100 parts by mol of Cu.

Preferably, an average area ratio A1 of the conductor 61 in a cross section of the first region 6a1 is 30% to 60%. Preferably, an average area ratio A2 of the conductor 61 in a cross section of the second region 6a2 is 70% to 90%. As mentioned above, an optimal content ratio of the conductor 61 differs between the first region 6a1 and the second region 6a2. A2 of the second region 6a2 is preferably larger than A1 of the first region 6a1, and A2/A1 is more preferably 1.3 to 2.4. When the average area ratios A1 and A2 satisfy the above-mentioned requirements, the plating property and the joint reliability of the baked electrode layer 6a are compatible more favorably.

The external electrode 6 can be analyzed by a cross-sectional observation using a scanning electron microscope (SEM), a scanning transmission electron microscope (STEM), or the like. For example, the compositions of the conductor 61, the glass frits 621, and the high-melting-point oxides 622 can be measured by performing a component analysis with an electron probe microanalyzer (EPMA) in the cross-sectional observation. Preferably, the component analysis is performed at least at three points, and the composition of each element (61, 621, 622) is calculated from an average of the measurement results. In the present embodiment, when a component analysis or the like is performed by EPMA, an energy dispersion type spectroscope (EDS) or a wavelength dispersion type spectroscope (WDS) can be used as the X-ray spectroscope.

An area ratio (A1, A2) of the conductor 61 can be measured by performing an image analysis of a cross-sectional photograph obtained by a cross-sectional observation with SEM, STEM, or the like. When a cross section of the baked electrode layer 6a is observed with a backscattered electron image of SEM, a HAADF image of STEM, or the like, the conductor 61 with metal bonds can be recognized as a bright contrast part, and the non-metal components, such as the glass frits 621 (further including voids and oxides), can be recognized as a dark contrast part. Thus, an area ratio of the conductor 61 in a cross section of the baked electrode layer 6a can be calculated as a ratio of an area of the bright contrast part to an area of the entire measurement visual field by, for example, binarizing the cross-sectional photograph. Preferably, this measurement for the area ratio is performed at least at five visual fields to calculate this average.

In the cross-sectional observation as mentioned above, a boundary may be visible or may not be visible between the first region 6a1 and the second region 6a2. Thus, when the average area ratio A1 in the first region 6a1 is measured, an observation visual field is determined within the predetermined distance t1 mentioned above. Likewise, when the average area ratio A2 in the second region 6a2 is measured, an observation visual field is determined within the predetermined distance t2 mentioned above.

In the above-mentioned cross-sectional observation, the non-metal components 62 including the glass frits 621, the high-melting-point oxides 622, other oxides, voids, and the like are present in portions (dark contract part) other than the conductor 61. In the composition images of SEM, STEM, and the like, it is not easy to determine the difference between oxide and glass and the difference between oxide and void by the contrast brightness. Thus, it is difficult to measure the ratio of glass or the ratio of oxide in the non-metal components 62. When these ratios are roughly calculated, however, the glass frits 621 are mainly contained as the non-metal components 62 in the first region 6a1, and the number ratio of glass frits 621 is larger than that of the high-melting-point oxides 622, other oxides, voids, and the like. The high-melting-point oxides 622 are mainly contained as the non-metal components 62 in the second region 6a2, and the number ratio of high-melting-point oxides 622 is larger than that of glass frits 621, other oxides, voids, and the like. The number ratio can be roughly calculated by a point analysis of the non-metal components 62 contained in each region with EPMA.

Next, a method of manufacturing the multilayer ceramic capacitor 2 shown in FIG. 1A is explained.

First, a manufacturing process of the element body 4 is explained. In the manufacturing process of the element body 4, a dielectric paste to be the ceramic layers 10 after firing and an internal-electrode paste to be the internal electrode layers 12 after firing are prepared.

The dielectric paste is prepared, for example, in the following manner. First, dielectric raw materials are uniformly mixed by means such as wet mixing, dried, and thereafter subjected to a heat treatment under predetermined conditions to obtain a calcined powder. Next, a known organic vehicle or a known water based vehicle is added to the obtained calcined powder and kneaded to prepare a dielectric paste. The dielectric paste thus obtained is turned into sheets by a method such as a doctor blade method to obtain ceramic green sheets. If necessary, the dielectric paste may contain one or more additives selected from various dispersants, plasticizers, dielectrics, sub-component compounds, glass frit, and the like.

Meanwhile, an internal-electrode paste is prepared by kneading a conductive powder made of a conductive metal or an alloy thereof with a known binder and solvent. If necessary, the internal-electrode paste may contain a ceramic powder (e.g., calcium zirconate strontium powder) as an inhibitor. The inhibitor has an effect of preventing the sintering of the conductive powder in the firing step.

Next, the internal-electrode paste is applied on the ceramic green sheets in a predetermined pattern by various printing methods, such as screen printing, or a transfer method. Then, the green sheets with the internal electrode pattern are laminated and pressed in the lamination direction to obtain a mother laminated body. At this time, the ceramic green sheets and the internal electrode patterns are laminated so that the ceramic green sheets are located on the upper surface and the lower surface of the mother laminated body in the lamination direction.

The mother laminated body obtained by the above-mentioned step is cut into a predetermined size by dicing or push-cutting to obtain a plurality of green chips. If necessary, the green chips may be solidified and dried so as to remove the plasticizer and the like and may be subjected to a barrel polishing using a horizontal centrifugal barrel machine or the like after the solidification and drying. In the barrel polishing, unnecessary parts, such as burrs, generated during the cutting are polished by putting the green chips into a barrel container together with a medium and a polishing liquid and applying a rotational movement or vibration to the barrel container. The green chips after the barrel polishing are washed with a cleaning solution, such as water, and dried.

Next, the green chips obtained above are subjected to a binder removal treatment and a firing treatment to obtain the element body 4.

The conditions for the binder removal treatment are appropriately determined based on the main component composition of the ceramic layers 10 and the main component composition of the internal electrode layers 12 and are not limited. For example, the heating rate is preferably 5-300° C./hour, the holding temperature is preferably 180-400° C., and the temperature holding time is preferably 0.5-24 hours. The binder removal atmosphere is the air or a reducing atmosphere.

The conditions for the firing treatment is appropriately determined based on the main component composition of the ceramic layers 10 and the main component composition of the internal electrode layers 12 and are not limited. For example, the holding temperature during firing is preferably 1200-1400° C., more preferably 1220-1300° C., the holding time is preferably 0.5-8 hours, more preferably 1-3 hours, and the heating rate and the cooling rate (temperature decreasing rate) are preferably 50-500° C./hour. The firing atmosphere is preferably a reducing atmosphere. As the atmospheric gas, for example, a mixed gas of $N_2$ and $H_2$ can be humidified and used. When the internal electrode layers 12 are made of a base metal, such as Ni and Ni alloys, the oxygen partial pressure in the firing atmosphere is preferably $1.0 \times 10^{-14}$ to $10^{-10}$ MPa.

If necessary, the element body 4 may be subjected to a reoxidation treatment (annealing) after firing. As the conditions for annealing, preferably, for example, the oxygen partial pressure during annealing is higher than that during firing, and the holding temperature is 1150° C. or less.

In the above-mentioned binder removal treatment, firing treatment, and annealing treatment, for example, a wetter is used to humidify the $N_2$ gas, the mixed gas, and the like. In this case, the water temperature is preferably about 5-75° C. The binder removal treatment, the firing treatment, and the annealing treatment may be performed continuously or independently.

Next, the baked electrode layer 6a is formed on the outer surface of the element body 4 obtained above. In the formation of the baked electrode layer 6a, first, a first conductive paste for forming the first region 6a1 and a second conductive paste for forming the second region 6a2 are prepared. The first conductive paste contains a metal powder to be the conductor 61 after the baking treatment and the glass frits 621. Meanwhile, the second conductive paste contains a metal powder to be the conductor 61 after the baking treatment and a powder of the high-melting-point oxides 622. In addition, the first conductive paste and the second conductive paste may further appropriately contain a binder, a solvent, a dispersant, a plasticizer, and a sub-component raw material such as an oxide powder.

The glass frits 621 added to the paste can be manufactured, for example, in the following manner. First, starting raw materials, such as ZnO powder, $SiO_2$ powder, $B_2O_3$ powder, $CaCO_3$ powder, $SrCO_3$ powder, and other oxide powders, are mixed at a predetermined ratio, and this mixture is thereafter heated and melted in a state of being put into a crucible. Then, the molten mixture is dropped into water and rapidly cooled to obtain a glass. Then, the glass is pulverized to a predetermined particle size using a mortar, a ball mill, or the like to obtain the glass frits 621. At this time, the composition of the glass frits 621 is adjusted according to the blending ratio of the starting raw materials. Meanwhile, the high-melting-point oxides 622 can be manufactured by mixing starting raw materials, such as ZnO powder and $SiO_2$ powder, at a predetermined ratio, calcining the mixture, and pulverizing it to a predetermined particle size. The composition of the high-melting-point oxides 622 is adjusted according to the blending ratio of the starting raw materials.

The area ratios A1 and A2 of the conductor 61 are adjusted by a blending ratio of the metal powder added to the conductive pastes.

The binder, solvent, and dispersant used for each conductive paste are not limited and can be materials similar to those of the dielectric paste. For example, the binder can be appropriately selected from various normal binders, such as acrylic, butyral, and ethyl cellulose, and the solvent can be appropriately selected from various organic solvents, such as alcohol, methyl ethyl ketone, acetone, toluene, tarpineol, and butyl carbitol, and water based solvents.

After the above-mentioned two types of conductive pastes are prepared, the first conductive paste is applied to the outer surface of the element body 4 by a dipping method or a printing method and dried. Then, the first conductive paste is subjected to a baking treatment by holding the element body 4 at a temperature of 700-1000° C. for 0.1-3 hours. Then, the second conductive paste is applied onto the baked first conductive paste by a dipping method or a printing method and dried. Then, the second conductive paste is subjected to a baking treatment by holding the element body 4 at a temperature of 700-1000° C. for 0.1-3 hours. Accordingly, the baked electrode layer 6a including the predetermined first region 6a1 and second region 6a2 can be formed. In the above-mentioned manner, the first conductive paste and the second conductive paste are separately subjected to a baking treatment, but may be subjected to a baking treatment at the same time.

After the baked electrode layer 6a is formed, the plating electrode layer 6b can be formed on the baked electrode layer 6a by performing a plating treatment, such as electroplating and electroless plating. A resin electrode may be formed on the baked electrode 6a. In this case, a resin-electrode conductive paste containing a thermosetting resin is applied by a dipping method, a printing method, or the like so as to cover the baked electrode layer 6a and is thereafter subjected to a curing treatment. A plating electrode layer may further be formed on the resin electrode.

After the above-mentioned process, the multilayer ceramic capacitor 2 including the external electrodes 6 is obtained.

The obtained multilayer ceramic capacitor 2 can be surface-mounted on a substrate, such as a printed wiring board, using solder (including molten solder, solder cream, and solder paste) or a conductive adhesive and can be used in various electronics. Instead, the multilayer ceramic capacitor 2 can be mounted on a substrate via a wire-shaped lead terminal or a plate-shaped metal terminal.

Summary of First Embodiment

The multilayer ceramic capacitor 2 according to the present embodiment includes the baked electrode layer 6a including the conductor 61 containing Cu and the non-metal components 62 diffused in the conductor 61. The baked electrode layer 6a includes the first region 6a1 contacted with the end surface 4a of the element body 4 and the second region 6a2 contacted with the plating electrode layer 6b. The first region 6a1 includes the glass frits 621 containing predetermined elements, and the second region 6a2 includes the high-melting-point oxides 622 having a higher melting point than Cu.

The present inventors have found that the multilayer ceramic capacitor 2 having the above-mentioned configurations improves the plating property of the baked electrode layer 6a and the joint reliability of the external electrode 6 to the element body 4. That is, the multilayer ceramic capacitor 2 according to the present embodiment prevents plating defects and has a favorable solder wettability of the external electrodes 6. Moreover, the multilayer ceramic capacitor 2 according to the present embodiment can prevent the external electrode 6 from peeling from the end surface 4a of the element body 4 even if receiving a thermal shock.

In particular, since the glass frits 621 or the high-melting-point oxides 622 satisfy a predetermined composition ratio, the plating property and the joint reliability of the baked electrode layer 6a are more favorably compatible with each other.

The reason why the above-mentioned effect is obtained is not necessarily clear, but the following reasons can be considered.

First, in the present embodiment, the second region 6a2 including the high-melting-point oxides 622 is present on the outer surface 6ab of the baked electrode layer 6a contacted with the plating electrode layer 6b. Since the high-melting-point oxides 622 are present near the outer surface 6ab, it is possible to prevent the deposition of the glass frits 621 on the outer surface 6ab of the baked electrode layer 6a. As a result, the generation of plating defects can be prevented in the formation of the plating electrode layer 6b on the baked electrode layer 6a.

In the present embodiment, the glass frits 621 including predetermined elements are contained in the first region 6a1 bonded with the end surface 4a of the element body 4. The glass frits 621 are considered to soften during baking, enter the conductor 61 and between the conductor 61 and the end surface 4a, and improve the joint strength of the baked electrode layer 6a to the element body 4. As a result, the multilayer ceramic capacitor 2 according to the present embodiment can prevent the external electrode 6 from peeling from the end surface 4a of the element body 4 even if receiving a thermal shock.

Second Embodiment

Figure 1B:
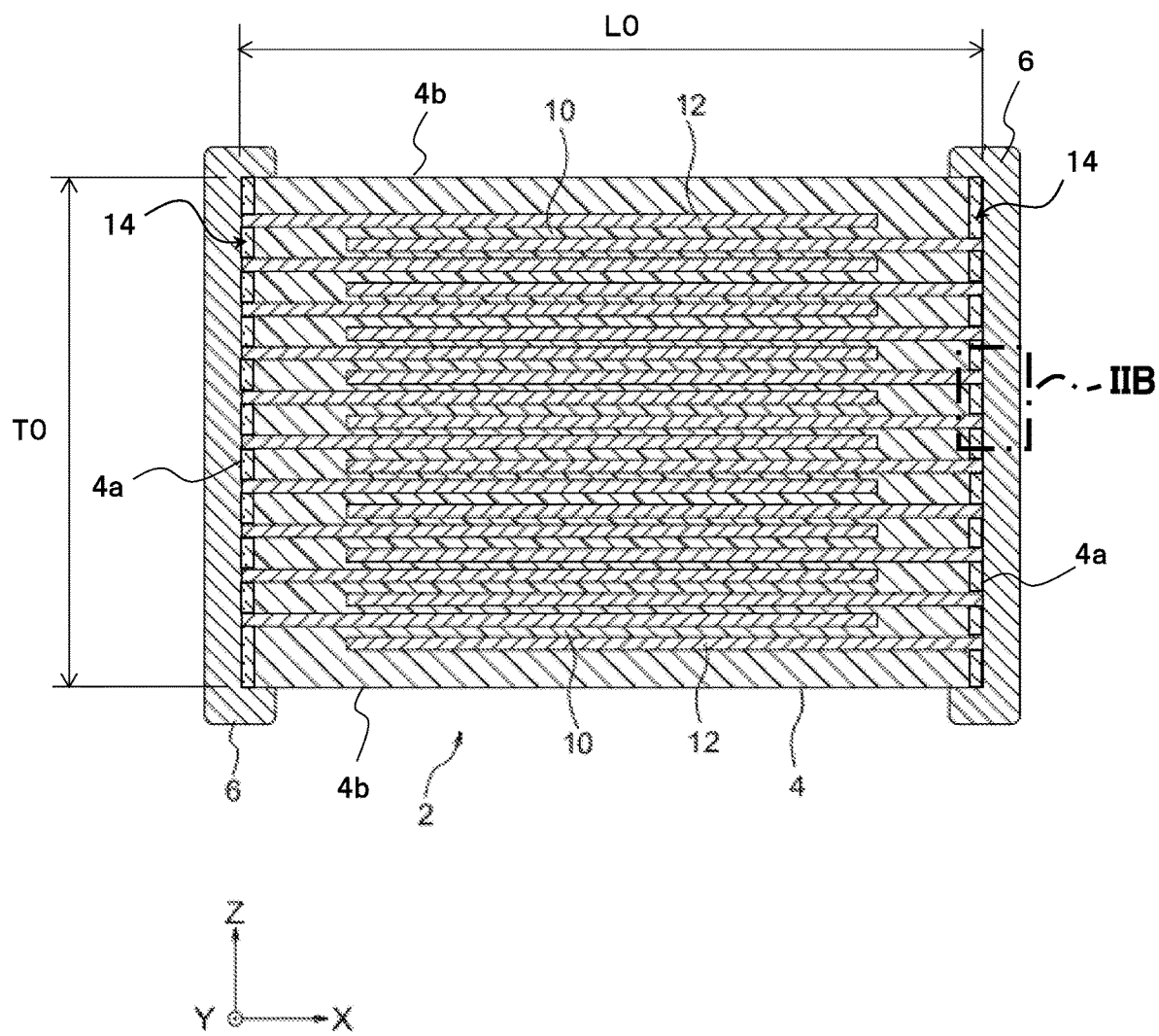
FIG. 1B is a cross-sectional view illustrating a multilayer ceramic capacitor according to another embodiment of the present invention.

Hereinafter, Second Embodiment of the present invention is explained based on FIG. 1B and FIG. 2B. The configurations of Second Embodiment common with those of First Embodiment are not explained and are provided with the same references.

Figure 2B:
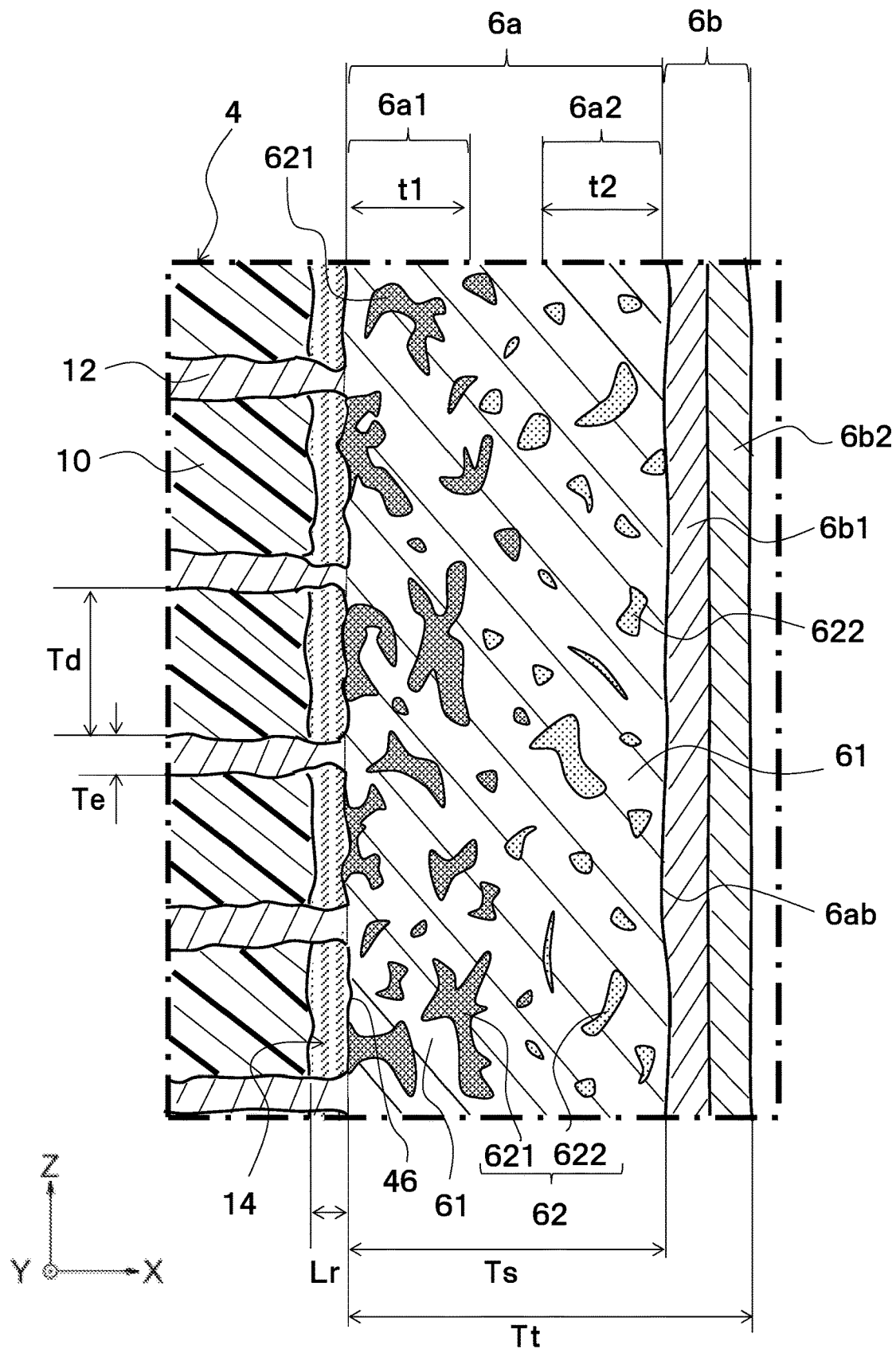
FIG. 2B is an enlarged cross-sectional view of a main part of the region IIB shown in FIG. 1B.

In Second Embodiment, the boundary layer 14 is present between the external electrode 6 and the ceramic layers 10 of the element body 4 (see FIG. 2B). The boundary layer 14 is present at the ends of the ceramic layers 10 in the X-axis direction and constitutes a part of the outermost surface of the end surface 4a of the element body 4. Although FIG. 1B does not illustrate, when the external electrode 6 is formed from the end surface 4a to a part of the side surface 4b, the boundary layer 14 is preferably also present on the outermost surface of the side surface 4b in addition to the end surface 4a.

In the cross section shown in FIG. 2B, the internal electrode layers 12 penetrate the boundary layer 14 and are exposed to the end surface 4a, and the exposed ends of the internal electrode layers 12 are electrically connected to the baked electrode layer 6a (particularly, the conductor 61) of the external electrode 6. When an X-Z cross section is observed, however, the end surface 4a may have a point where the boundary layer 14 covers the ends of a part of the internal electrode layers 12 (the ends in the X-axis direction). Each of the internal electrode layers 12 exists along the Y-axis direction. As long as the end of each of the internal electrode layers 12 even partly penetrates the boundary layer 14 and is directly in contact with the baked electrode layer 6a, each of the internal electrode layers 12 and the external electrode 6 can electrically be connected even if the ends are partly covered with the boundary layer 14. The external electrode 6 may partly enter the boundary layer 14. The joint boundary 46 between the external electrode 6 and the end surface 4a of the element body 4 (the boundary layer 14, the internal electrode layers 12, or the like) may be unclear.

The average length Lr (average thickness) of the boundary layer 14 in the X-axis direction is preferably 0.5 μm to 10 μm and is more preferably 1 μm to 5 μm.

In the boundary layer 14, preferably, the main component is an oxide containing predetermined elements. The main component of the boundary layer 14 is a component contained at 50 mol % or more with respect to the entire boundary layer 14. The predetermined elements are Zn, Si, an A-site element of the perovskite compound contained in the ceramic layers 10 (preferably, Ca and/or Sr).

The main-component oxide of the boundary layer 14 is preferably a non-vitrified crystalline oxide and specifically preferably satisfies the following composition. That is, an A-site element content is 0.3 parts by mol to 0.45 parts by mol, a Zn content is 0.15 parts by mol to 0.45 parts by mol, and a remainder of Si (preferably, 0.2 parts by mol to 0.45 parts by mol), provided that the total of the Zn content, the Si content, and the A-site element content is 1 part by mol.

In particular, among oxides satisfying the above-mentioned composition ratio, $(Ca,Sr)_2Zn(Si_2O_7)$ is preferably contained in the boundary layer 14. The ratio between Ca and Sr in the above-mentioned composition formula is not limited.

In addition to the above-mentioned main-component oxide, preferably, the boundary layer 14 contains $ZrO_2$ and/or the main-component compound (perovskite compound) of the ceramic layers 10. The above compound can be contained by intentionally being added to a raw material paste for the boundary layer 14. The above compound may intrude the boundary layer 14 by being diffused from the ceramic layers 10, and the amount of the above compound in the boundary layer 14 is no limited.

In addition, the boundary layer 14 may include a trace compound containing Al, Ti, Ca, B, etc. The boundary layer 14 may include a conductive metal component, such as Cu and Ni. There is no limit to the amount of the trace compounds or the metal component.

The boundary layer 14 with the above-mentioned characteristics has a function of improving the joint strength between the ceramic layers 10 of the element body 4 and the baked electrode layer 6a. In particular, when a part of the glass frits 621 contained in the baked electrode layer 6a is directly in contact with a part of the boundary layer 14, the joint strength of the baked electrode layer 6a to the end surface 4a is further improved. Both of the glass frits 621 and the boundary layer 14 contain Zn, Si, and an A-site element (Ca, Sr), and the mutual diffusion of these common elements between the glass frits 621 and the boundary layer 14 is considered to improve the joint strength of the baked electrode layer 6a.

Preferably, particles of the glass frits 621 directly in contact with the boundary layer 14 have a shape that exhibits an anchor effect. The "shape that exhibits an anchor effect" means that the particles do not spread thinly along the outer surface (Y-Z plane) of the boundary layer 14, but spread three-dimensionally from the outer surface of the boundary layer 14 toward the inside of the baked electrode layer 6a (i.e., outward in the X-axis direction) as shown in FIG. 2B. That is, when the particles of the glass frits 621 located in the joint boundary 46 enter from the joint boundary 46 toward the gap of the conductor 61, an anchor effect is obtained as if the barb of the hook bites in, and the joint strength of the external electrode 6 to the element body 4 is further improved. The anchor effect can be obtained by controlling the particle shape of the glass frit added to a raw material paste of the baked electrode layer 6a.

As with the baked electrode layer 6a, the boundary layer 14 can be analyzed by a cross-sectional observation with SEM, STEM, or the like. For example, an average length Lr of the boundary layer 14 can be measured by an image analysis of a cross-sectional photograph. The composition of the boundary layer 14 can be measured by a component analysis with EPMA.

The boundary layer 14 can be manufactured by subjecting the first conductive paste to a high-temperature baking treatment or using a boundary-layer paste. Preferably, a boundary-layer paste is used. The boundary layer 14 may be formed by ceramic coating with various vapor deposition methods without using a paste.

When a high-temperature baking treatment is employed, the holding temperature is preferably more than 800° C. (more preferably, 850° C. or more) and 1100° C. or less, and the holding time is preferably 0.5-3 hours. The boundary layers 14 are formed by baking the first conductive paste at a higher temperature than a normal baking treatment or by baking the first conductive paste over a long period of time.

When a boundary-layer paste is employed, the boundary layers 14 can be formed by applying a boundary-layer paste onto the outer surface of green chips before firing or the outer surface of the element body 4 after firing and baking it.

In this case, the boundary-layer paste contains a boundary-layer raw material powder, a binder, and a solvent, and if necessary, a dispersant, a plasticizer, or the like may be added. The boundary-layer raw material powder is obtained by mixing starting raw materials, such as ZnO powder, $SiO_2$ powder, $B_2O_3$ powder, $CaCO_3$ powder, and $SrCO_3$ powder, in a predetermined ratio and then calcining and pulverizing the mixture. In addition, a powder of a dielectric compound (the main component of the ceramic layers 10), a $ZrO_2$ powder, a powder of a trace compound (e.g., $Al_2O_3$), a Cu powder, a Ni powder, an alloy powder containing Cu, Ni, etc., or the like may be added to the boundary-layer raw material powder.

The boundary-layer paste can be applied to the green chips or the element body 4 by various printing methods, such as a dip method and screen printing, a coating method using a dispenser or the like, a spraying method using a spray, or the like. The boundary-layer paste is applied to at least the end surface 4a and may further be applied to a part of the side surface 4b. At this time, the average length Lr (average thickness) of the boundary layers 14 can be adjusted by controlling the application amount of the boundary-layer paste.

When the boundary-layer paste is applied to the element body 4, the boundary layers 14 are formed by drying the boundary-layer paste after application and subjecting it to a baking treatment at a temperature of 700-1000° C. for 0.1-3 hours. In this case, the boundary-layer paste may be baked at the same time as baking the first conductive paste. The average length Lr of the boundary layers 14 is also affected by the conditions of the baking treatment. If the temperature during the baking treatment is low or the holding time is short, the average length Lr tends to be small (the average thickness becomes small). In addition, the average length Lr may be affected by the application amount of the boundary layer-paste. When the boundary-layer paste is applied to the green chips, the boundary-layer paste is baked at the time of firing the green chips.

When the boundary layers are formed using a paste, the end surface 4a of the element body 4 is preferably subjected to a sandblasting treatment or a wet barrel polishing before applying the paste and/or after baking the paste. In the sandblasting treatment or the wet barrel polishing, the ceramic component (dielectric layers 10 or boundary layers 14) is selectively polished rather than the ends of the internal electrode layers 12, and the ends of the internal electrode layers 12 are easily exposed on the outermost surface of the end surface 4a. That is, the sandblasting treatment or the wet barrel polishing further improves the electrical bonding of the internal electrode layers 12 to the external electrode 6. Even if the sandblasting treatment or the wet barrel polishing is not performed, the external electrodes 6 and the internal electrode layers 12 can electrically be conducted with each other to some degree. This is because the glass frits 621, the oxide constituting the boundary layers 14, and the main component ($ABO_3$) of the ceramic layers 10 react with each other after the conductive material of the internal electrode layers 12 and the conductive material of the external electrodes 6 react with each other, and it is thereby difficult to form the oxide from the boundary-layer paste at the ends of the internal electrode layers 12 in the X-axis direction.

Summary of Second Embodiment

In the multilayer ceramic capacitor 2 according to Second Embodiment, the boundary layer 14 containing predetermined elements is present between the baked electrode layer 6a and the ceramic layers 10. The presence of the boundary layer 14 further improves the joint reliability of the external electrode 6. The reason why this effect is obtained is not necessarily clear, but the mutual diffusion phenomenon is considered to contribute to improvement in joint reliability.

Specifically, in the multilayer ceramic capacitor 2, since the boundary layer 14 is present at the joint section with the external electrode 6, Ca, Sr, Zn, Si, and the like are common elements between the element body 4 and the external electrode 6. Since a plurality of common elements is present, the multiple common elements are considered to mutually be diffused between the baked electrode layer 6a and the boundary layer 14. As a result, the joint strength of the external electrode 6 to the element body 4 is improved.

In particular, the boundary layer 14 is considered to exhibit a function of reducing the thermal stress generated between the element body 4 and the external electrode 6 by satisfying a predetermined composition ratio. There is a difference in linear expansion coefficient between the baked electrode layer 6a containing the amorphous glass frits 621 and the crystalline ceramic layers 10. On the other hand, when the boundary layer 14 has a predetermined composition, the boundary layer 14 has a linear expansion coefficient close to that of the ceramic layers 10, and the difference in linear expansion coefficient between the external electrode 6 and the element body 4 is considered to be smaller than that when the boundary layer 14 is not present. As a result, it is considered that the thermal stress is less likely to occur in the joint boundary 46 between the element body 4 and the baked electrode 6a, and that the resistance to thermal shock is further improved.

Except for including the boundary layer 14, the multilayer ceramic capacitor 2 according to Second Embodiment is similar to that according to First Embodiment and exhibits effects similar to those in First Embodiment.

Hereinbefore, embodiments of the present invention are explained, but the present invention is not limited to the above-mentioned embodiments and can be modified variously without departing from the gist of the present invention.

In the present embodiment, for example, the multilayer ceramic capacitor 2 is exemplified as the ceramic electronic device, but the ceramic electronic device of the present invention may be, for example, bandpass filters, multilayer three-terminal filters, piezoelectric elements, thermistors, varistors, or the like.

In the present embodiment, the ceramic layers 10 and the internal electrode layers 12 are laminated in the Z-axis direction, but the lamination direction may be the X-axis direction or the Y-axis direction. In that case, the external electrodes 6 are formed according to the exposed surfaces of the internal electrode layers 12. The element body 4 is not necessarily a laminated body and may be a single layer. The internal electrode layers 12 may be drawn out to the outer surface of the element body 4 via through-hole electrodes. In this case, the through-hole electrodes and the external electrodes 6 are electrically connected to each other.

EXAMPLES

Hereinafter, the present invention is explained in more detail with examples of the present invention, but the present invention is not limited to the examples.

Experiment 1

In Experiment 1, multilayer ceramic capacitors 2 according to Examples 1 and 2 were manufactured in the following manner. First, a dielectric paste and an internal-electrode paste were prepared, and green chips were manufactured by a sheet method using the pastes. At this time, as a dielectric raw material to be a main component of ceramic layers 10, calcium zirconate strontium (composition formula: $(Ca_{0.7}Sr_{0.3})(Zr_{0.96}Ti_{0.04})O_3$) was used in Examples 1 and 2. In each Example, $SiO_2$, MnO, $Al_2O_3$, and the like were added as sub-components of the ceramic layers 10, and the main component of internal electrode layers 12 was Ni.

Next, the green chips obtained above were subjected to a binder removal treatment with the conditions mentioned in the embodiments and thereafter subjected to a firing treatment to obtain an element body 4. The conditions for the firing treatment were holding temperature: 1300° C., holding time: 2 hours, and atmospheric gas: humidified $N_2+H_2$ mixed gas. Then, the above-mentioned element body 4 was subjected to an annealing treatment with the conditions mentioned in the embodiments.

Next, a first conductive paste and a second conductive paste for the baked electrode layer were prepared. A Cu powder constituting the conductor 61 and B—Zn—Si based glass frits 621 as non-metal components 62 were added to the first conductive paste of Example 1. Meanwhile, a Cu powder constituting the conductor 61 and B—Zn—Si—Ca—Sr based glass frits 621 as non-metal components 62 were added to the first conductive paste of Example 2. A Cu powder and a $Zn_2SiO_4$ powder (high-melting-point oxides 622) were added to the second conductive paste of each of Examples 1 and 2.

Next, the first conductive paste was applied to the outer surface of the element body 4 (the end surfaces 4a and a part of each side surface 4b) by a dipping method and dried. Then, the first conductive paste was baked by holding the element body 4 at 800° C. for 0.5 hours to form a part of a baked electrode layer 6a. Moreover, the second conductive paste was applied onto the baked first conductive paste by a dipping method and dried. Then, the second conductive paste was baked by holding the element body 4 at 800° C. for 0.5 hours to form the baked electrode layer 6a including a first region 6a1 and a second region 6a2.

A Ni plating electrode layer and a Sn plating electrode layer were formed on the baked electrode layer 6a. Accordingly, capacitor samples (multilayer ceramic capacitors 2) with the external electrodes 6 were obtained. 300 or more capacitor samples were manufactured for each of Examples 1 and 2.

In each of Examples 1 and 2 of Experiment 1, the size of the element body 4 in any of the capacitor samples was L0×W0×T0=2.0 mm×1.25 mm×1.25 mm. The lamination number of ceramic layers 10 sandwiched by the internal electrode layers 12 was 80.

Samples for destructive inspection were extracted from the capacitor samples according to each of Examples 1 and 2, and a cross-sectional observation was performed by SEM using the samples. Specifically, the extracted samples were cut along the X-Z plane, the cross sections were subjected to mirror polishing, and an average thickness Td of the ceramic layers 10, an average thickness Te of the internal electrode layers 12, an average thickness Ts of the baked electrode layer 6a, and an average thickness Tt of the external electrode 6 on the end surface side were thereafter measured by SEM. The measurement results of Examples 1 and 2 were as follows.

Average Thickness Td of Ceramic Layers 10: 10 μm

Average Thickness Te of Internal Electrode Layers 12: 1.5 μm

Average Thickness Ts of Baked Electrode Layer 6a: 36 μm

Average Thickness Tt of External Electrode 6: 46 μm

In the above-mentioned cross-sectional observation, a component analysis for the conductor 61 and the non-metal components 62 (the glass frits 621 and the high-melting-point oxides 622) contained in the baked electrode layer 6a was performed by EPMA. As a result, the composition of the raw material powder added to the raw material pastes (the first conductive paste and the second conductive paste) and the measurement results were substantially the same in any of Examples. In the cross-sectional observation, the glass frits 621 were contained in the first region 6a1, and the high-melting-point oxides 622 were contained in the second region 6a2, in all of Examples.

In Experiment 1, a solder wettability test was performed for evaluation of plating property (presence or absence of plating defects) of the prepared capacitor samples. In addition, a thermal shock test (thermal cycle test) was performed for evaluation of the joint reliability of the external electrodes 6 in the prepared capacitor samples. The details are explained below.

Solder Wettability Test

In a solder wettability test, first, as a pretreatment for the test, the capacitor samples were held in a thermostatic bath (PCT tank) controlled at a temperature of 105° C. and a relative humidity of 100% RH for 4 hours. Then, the capacitor samples were immersed in a solder bath at 245° C. for 3 seconds. At this time, Sn—Ag—Cu solder was used, and 0.1 mm of the capacitor samples on the end surface side was immersed in the solder bath. Then, the capacitor samples were pulled up from the solder bath, and the end surfaces 4a of the capacitor samples were thereafter observed to measure an area where solder spreads wet on the end surface 4a.

Here, the relation between the wet area of solder and the plating property is explained. Examples of plating defects include adhesion abnormalities, such as peeling and swelling of plating electrodes, undeposition abnormalities, such as stains, spots, pits, and pinholes, and other abnormalities, such as foreign matter adhesion. When such plating defects are present, the wettability of the plating electrode to solder tends to decrease. Thus, as described above, the presence or absence of plating defects and the ease of forming the plating can be evaluated indirectly by measuring the wet area of the solder on the end surface.

In the solder wettability test according to the present examples, a case in which the area where the solder was spread wet over the end surface 4a was 95% or more was considered to be pass, and a case in which the area where the solder was spread wet over the end surface 4a was less than 95% was considered to be fail. The test was performed on 10 capacitor samples for each example. A ratio of failed samples (NG ratio) was calculated. The evaluation results are shown in Table 1.

Air-Tank-Type Thermal Shock Test

In an air-tank-type thermal shock test, the capacitor samples were held in an air tank at −55° C. for 30 minutes and then held in an air tank at 150° C. for 30 minutes per cycle, and this was repeated for 1000 cycles. In this test, pass/fail was determined based on the attenuation rate in capacitance. A sample where a ratio (Cp/Ca) of a capacitance Cp after the test to a capacitance Ca before the test was 0.9 (90%) or more was considered to be pass, and a sample where a ratio (Cp/Ca) of a capacitance Cp after the test to a capacitance Ca before the test was less than 0.9 was considered to be fail. In Experiment 1, the test was performed on 80 capacitor samples in each Example. A ratio of failed samples (NG ratio) was calculated. The evaluation results are shown in Table 1.

In Experiment 1, capacitor samples according to Comparative Examples 1 and 2 were manufactured in addition to Examples 1 and 2 mentioned above.

Comparative Example 1

In Comparative Example 1, capacitor samples in which a baked electrode layer was formed only with a first conductive paste were manufactured. A Cu powder and B—Zn—Si—Ca—Sr based glass frits were added to the first conductive paste of Comparative Example 1, and no high-melting-point oxides were added thereto. Only the first conductive paste was applied to the outer surface of the element body 4 and baked to form a baked electrode layer. At this time, the application amount of the paste was controlled so that the average thickness of the baked electrode layer whose raw material was only the first conductive paste was substantially the same as the average thickness Ts of the baked electrode layer 6a in Examples 1 and 2. In Comparative Example 1, the production conditions were the same as those of Examples 1 and 2 described above except for using no second conductive paste, and Comparative Example 1 was evaluated in the same manner as in Examples 1 and 2. The evaluation results are shown in Table 1.

Comparative Example 2

In Comparative Example 2, capacitor samples in which a baked electrode layer was formed only with a second conductive paste were manufactured. A Cu powder and a $Zn_2SiO_4$ powder were added to the second conductive paste of Comparative Example 2, and no glass frits were added thereto. Only the second conductive paste was applied to the outer surface of the element body 4 and baked to form a baked electrode layer. At this time, the application amount of the paste was controlled so that the average thickness of the baked electrode layer whose raw material was only the second conductive paste was substantially the same as the average thickness Ts of the baked electrode layer 6a in Examples 1 and 2. In Comparative Example 2, the production conditions were the same as those of Examples 1 and 2 described above except for using no first conductive paste, and Comparative Example 2 was evaluated in the same manner as in Examples 1 and 2. The evaluation results are shown in Table 1.

arts to satisfy both of the plating property and the joint reliability at the same time.

On the other hand, in Examples 1 and 2, the NG ratio of the solder wettability test and the NG ratio of the air-tank-type thermal shock test were 0%, and the plating property and the joint reliability were more favorable than those of Comparative Examples 1 and 2. This result indicates that both of the plating property and the joint reliability can be improved at the same time by containing predetermined glass frits 621 near the joint boundary 46 and predetermined high-melting-point oxides near the interface with the plating electrode layer 6b (near the outer surface 6ab).

Experiment 2

In Experiment 2, capacitor samples according to Examples 3-5 were manufactured by changing the composition of the glass frits 621 contained in the first region 6a1. Specifically, in Experiment 2, the glass frits 621 were obtained by mixing, calcining, and pulverizing starting raw materials of $B_2O_3$ powder, ZnO powder, $SiO_2$ powder. At this time, the B content, the Zn content, and the Si content of the glass frits 621 were controlled by adjusting the blending ratio of the starting raw materials. Then, a first conductive paste was prepared using the glass frits 621 obtained above, and the capacitor samples were manufactured in the same manner as in Example 1 of Experiment 1. That is, in Examples 3-5, a $Zn_2SiO_4$ powder (high-melting-point oxides 622) was contained in the second region 6a2.

TABLE 1

| Sample No. | Ceramic Layers of Element Body Composition of Main Component | Baked Electrode Layer First Region Conductor | Baked Electrode Layer First Region Non-metal Components | Second Region Conductor |
|---|---|---|---|---|
| Comp. Ex. 1 | $(Ca_{0.7} Sr_{0.3})(Zr_{0.96} Ti_{0.04})O_3$ | Cu | B—Zn—Si—Ca—Sr glass | Cu |
| Comp. Ex. 2 | $(Ca_{0.7} Sr_{0.3})(Zr_{0.96} Ti_{0.04})O_3$ | Cu | $Zn_2SiO_4$ oxide | Cu |
| Ex. 1 | $(Ca_{0.7} Sr_{0.3})(Zr_{0.96} Ti_{0.04})O_3$ | Cu | B—Zn—Si glass | Cu |
| Ex. 2 | $(Ca_{0.7} Sr_{0.3})(Zr_{0.96} Ti_{0.04})O_3$ | Cu | B—Zn—Si—Ca—Sr glass | Cu |

| Sample No. | Baked Electrode Layer Second Region Non-metal Components | Result of Air-tank-type Thermal Shock Test (NG Number/Number of Test Samples n) | Result of Solder Wettability Test (NG Number/Number of Test Samples n) |
|---|---|---|---|
| Comp. Ex. 1 | B—Zn—Si—Ca—Sr glass | 0/80 | 2/10 |
| Comp. Ex. 2 | $Zn_2SiO_4$ oxide | 2/80 | 0/10 |
| Ex. 1 | $Zn_2SiO_4$ oxide | 0/80 | 0/10 |
| Ex. 2 | $Zn_2SiO_4$ oxide | 0/80 | 0/10 |

As shown in Table 1, the NG ratio of the solder wettability test was 2/10 in Comparative Example 1 (the baked electrode layer containing no predetermined high-melting-point oxides was formed). In Comparative Example 2 (the baked electrode layer containing no predetermined glass frits was formed), the NG ratio of the air-tank-type thermal shock test was 2/80. These results indicate that it is difficult for prior The composition of the glass frits 621 contained in the capacitor samples was measured by a component analysis with SEM-EPMA. The measurement results of Examples 3-5 are shown in Table 2.

In Experiment 2, as with Experiment 1, a solder wettability test and an air-tank-type thermal shock test were performed. The evaluation results are shown in Table 2.

TABLE 2

| Sample No. | First Region Composition of Glass Frits | | | Result of Air-tank-type Thermal Shock Test (NG Number/Number of Test Samples n) | Result of Solder Wettability Test (NG Number/Number of Test Samples n) |
|---|---|---|---|---|---|
| | B (parts by mol) | Zn (parts by mol) | Si (parts by mol) | | |
| Ex. 3 | 0.69 | 0.21 | 0.10 | 0/80 | 0/10 |
| Ex. 4 | 0.42 | 0.31 | 0.27 | 0/80 | 0/10 |
| Ex. 5 | 0.52 | 0.34 | 0.14 | 0/80 | 0/10 |

As shown in Table 2, the NG ratio of the solder wettability test and the air-tank-type thermal shock test was 0% in Examples 3-5. This result indicates that both of the plating property and the joint reliability can be satisfied at the same time when the composition of the glass frits 621 is within the range of Examples 3-5.

Experiment 3

In Experiment 3, capacitor samples according to Examples 6 and 7 were manufactured by changing the composition of the high-melting-point oxides 622 contained in the second region 6a2. Specifically, in Experiment 3, the high-melting-point oxides 622 were obtained by mixing, calcining, and pulverizing starting raw materials of ZnO powder and $SiO_2$ powder. At this time, the Zn content and the Si content of the high-melting-point oxides 622 were controlled by adjusting the blending ratio of the starting raw materials. Then, a second conductive paste was prepared using the powder obtained above, and the capacitor samples were manufactured in the same manner as in Example 1 of Experiment 1. That is, in Examples 6 and 7, B—Zn—Si glass frits 621 were contained in the first region 6a1.

The composition of the high-melting-point oxides 622 contained in the capacitor samples was measured by a component analysis with SEM-EPMA. The measurement results of Examples 6 and 7 are shown in Table 3.

In Experiment 3, as with Experiment 1, a solder wettability test and an air-tank-type thermal shock test were performed. The evaluation results are shown in Table 3.

TABLE 3

| Sample No. | Second Region Composition of High-melting-point Oxides Zn/Si (molar ratio) | Result of Air-tank-type Thermal Shock Test (NG Number/Number of Test Samples n) | Result of Solder Wettability Test (NG Number/Number of Test Samples n) |
|---|---|---|---|
| Ex. 6 | 1.50 | 0/80 | 0/10 |
| Ex. 7 | 2.33 | 0/80 | 0/10 |

As shown in Table 3, the NG ratio of the solder wettability test and the air-tank-type thermal shock test was 0% in Examples 6 and 7. This result indicates that both of the plating property and the joint reliability can be satisfied at the same time when the composition of the high-melting-point oxides 622 is within the range of Examples 6 and 7.

Experiment 4

In Experiment 4, capacitor samples according to Example 11 (no boundary layer 14 was formed) and capacitor samples according to Examples 12-14 (the boundary layer 14 was formed) were manufactured to evaluate the effect of the presence or absence of the boundary layer 14 on the joint reliability.

Example 11

In Example 11, capacitor samples were manufactured with the same conditions as Example 1 of Experiment 1. That is, in Example 11, B—Zn—Si based glass frits 621 were contained in the first region 6a1 of the baked electrode layer 6a, and high-melting-point oxides 622 composed of $Zn_2SiO_4$ were contained in the second region 6a2 of the baked electrode layer 6a.

Example 12

In Example 12, the boundary layer 14 was formed between the baked electrode layer 6a and the ceramic layers 10 by subjecting a first conductive paste to a high-temperature baking treatment. Specifically, the baking treatment was performed by holding the first conductive paste at a temperature of 900° C. for 0.5 hours. Except for the above-mentioned experimental conditions, capacitor samples according to Example 12 were obtained in the same manner as Example 11.

Cross sections of the capacitor samples obtained above were observed by SEM in the same manner as in Experiment 1. Then, it was confirmed that a boundary layer 14 having an average length Lr of 1.5 m was formed in Example 12, and that this boundary layer 14 contained $(Ca,Sr)ZnSi_2O_6$.

Example 13

In Example 13, the boundary layer 14 was formed between the baked electrode layer 6a and the ceramic layers 10 by applying a boundary-layer paste to green chips before firing and baking the boundary-layer paste at the same time as a firing treatment of the green chips. At this time, a $(Ca,Sr)_2Zn(Si_2O_7)$ powder was added to the boundary-layer paste, and this powder was obtained by subjecting starting raw materials of $CaCO_3$ powder, $SrCO_3$ powder, ZnO powder, and $SiO_2$ powder to a calcination treatment. In Example 13, the end surface 4a of the element body 4 after firing was subjected to a wet barrel polishing. Except for the above-mentioned experimental conditions, capacitor samples according to Example 13 were obtained in the same manner as Example 11.

Cross sections of the capacitor samples according to Example 13 were observed by SEM in the same manner as in Experiment 1. Then, it was confirmed that a boundary layer 14 having an average length Lr of 1.8 m was formed in Example 13, and that this boundary layer 14 contained the oxide having the composition shown in Table 4.

Example 14

In Example 14, the boundary layer 14 was formed between the baked electrode layer 6a and the ceramic layers 10 by applying a boundary-layer paste to the outer surface of the element body 4 after firing and subjecting it to a baking treatment at 900° C. for 0.5 hours. At this time, a $(Ca,Sr)_2Zn(Si_2O_7)$ powder was added to the boundary-layer paste, and this powder was obtained by subjecting starting raw materials of $CaCO_3$ powder, $SrCO_3$ powder, ZnO powder, and $SiO_2$ powder to a calcination treatment. In Example 14, the end surface 4a of the element body 4 was subjected to a wet barrel polishing before applying the boundary-layer paste. Except for the above-mentioned experimental conditions, capacitor samples according to Example 14 were obtained in the same manner as Example 11.

Cross sections of the capacitor samples according to Example 14 were observed by SEM in the same manner as in Experiment 1. Then, it was confirmed that a boundary layer 14 having an average length Lr of 1.9 m was formed in Example 14, and that this boundary layer 14 contained the oxide having the composition shown in Table 4.

In Experiment 4, an air-tank-type thermal shock test was performed in the same manner as in Experiment 1 for evaluation of the joint reliability of each example. In addition, a liquid-tank-type thermal shock test was performed with the following conditions in Experiment 4.

Liquid-Tank-Type Thermal Shock Test

In a liquid-tank-type thermal shock test, a thermal cycle was performed with a liquid tank, not an air tank. When a liquid tank is used, a steeper temperature change is applied to test samples compared to when an air tank is used, and the joint reliability of test samples can thus be evaluated under harsher conditions than in the air-tank-type test. Specifically, in the present examples, the capacitor samples were held in a liquid tank at −55° C. for 30 minutes and then held in a liquid tank at 150° C. for 30 minutes per cycle, and this was repeated for 1000 cycles. As with the air-tank-type thermal shock test, pass/fail in the liquid-tank-type thermal shock test was determined based on the attenuation rate in capacitance. In Experiment 4, the test was performed on 80 samples. A ratio of failed samples (NG ratio) was calculated. The evaluation results of each example in Experiment 4 are shown in Table 4.

As shown in Table 4, the formation of the boundary layer 14 further improved the joint reliability of the baked electrode layer 6a. In Examples 13 and 14, the NG ratio of the liquid-tank-type thermal shock test was 0%. The formation of the boundary layer 14 using the boundary-layer paste further improved the joint reliability.

Experiment 5

In Experiment 5, capacitor samples according to Examples 15-17 were manufactured by changing the composition of the boundary layer 14. The composition of the boundary layer 14 was controlled by adjusting the blending ratio of starting raw materials in the manufacture of $(Ca,Sr)Zn(Si_2O_7)$ powder added to a boundary-layer paste. Except for the above, the experimental conditions of Experiment 5 were the same as those of Example 14 of Experiment 4.

Cross sections of the capacitor samples according to each example of Experiment 5 were observed by SEM. Then, it was confirmed that a boundary layer 14 having an average length Lr of 2 m was formed in each of Examples 15-17. Moreover, the boundary layer 14 was subjected to a component analysis by EPMA, and each element content of the boundary layer 14 was as shown in Table 5.

In Experiment 5, a solder wettability test and a liquid-tank-type thermal shock test were performed with the above-mentioned conditions. The evaluation results of each example of Experiment 5 are shown in Table 5.

TABLE 4

| Sample No. | Boundary Layer | | Baked Electrode Layer | | Results of Thermal Shock Tests (NG Number/Number of Test Samples n) | |
|---|---|---|---|---|---|---|
| | Formation Method | Main Component | First Region Glass Frits | Second Region High-melting-point Oxides | Air-tank-type | Liquid-tank-type |
| Ex. 11 | — | — | B—Zn—Si glass | $Zn_2SiO_4$ | 0/80 | 6/80 |
| Ex. 12 | high-temperature baking treatment of first conductive paste | $(Ca_{0.7}Sr_{0.3})ZnSi_2O_6$ | B—Zn—Si glass | $Zn_2SiO_4$ | 0/80 | 1/80 |
| Ex. 13 | baking treatment of boundary-layer paste on green chips | $(Ca_{0.7}Sr_{0.3})_2 Zn (Si_2 O_7)$ | B—Zn—Si glass | $Zn_2SiO_4$ | 0/80 | 0/80 |
| Ex. 14 | baking treatment of boundary-layer paste on element after firing | $(Ca_{0.7}Sr_{0.3})_2 Zn (Si_2 O_7)$ | B—Zn—Si glass | $Zn_2SiO_4$ | 0/80 | 0/80 |

TABLE 5

| Sample No. | Composition of Boundary Layer | | | Result of Liquid-tank-type Thermal Shock Test (NG Number/Number of Test Samples n) | Result of Solder Wettability Test (NG Number/Number of Test Samples n) |
|---|---|---|---|---|---|
| | A element (Ca + Sr) parts by mol | Zn parts by mol | Si parts by mol | | |
| Ex. 15 | 0.31 | 0.26 | 0.43 | 0/80 | 0/10 |
| Ex. 16 | 0.44 | 0.16 | 0.40 | 0/80 | 0/10 |
| Ex. 17 | 0.35 | 0.44 | 0.21 | 0/80 | 0/10 |

As shown in Table 5, the NG ratio of the solder wettability test and the liquid-tank-type thermal shock test was 0% in Examples 15-17. This result indicates that when each element content of the boundary layer 14 was within the range of Examples 15-17, the joint reliability of the baked electrode layer 6a was further improved, and both of the plating property and the joint reliability were satisfied at the same time.

Experiment 6

In Experiment 6, capacitor samples according to Examples 21-24 were manufactured by changing an average area ratio A1 (A2) of the conductor 61 in each region 6a1 (6a2) of the baked electrode layer 6a. The average area ratio A1 (A2) of the conductor 61 was controlled by adjusting the blending ratio of Cu powder added to a first conductive paste and a second conductive paste. Table 6 shows a measurement result of the average area ratio A1 (A2) in each example by a cross-sectional observation with SEM. The area ratio A1 (A2) in each example was calculated by extracting three samples for destructive inspection from the manufactured capacitor samples and observing five or more visual fields of the cross sections of the extracted samples.

Except for the above, capacitor samples according to each of Examples 21-24 were obtained with the same experimental conditions as those of Example 1 of Experiment 1. In Experiment 6, a solder wettability test and an air-tank-type thermal shock test were also performed. The evaluation results of Experiment 6 are shown in Table 6.

TABLE 6

| Sample No. | Area Ratio of Conductor | | | Result of Air-tank-type Thermal Shock Test (NG Number/Number of Test Samples n) | Result of Solder Wettability Test (NG Number/Number of Test Samples n) |
|---|---|---|---|---|---|
| | First Region % | Second Region % | A2/A1 | | |
| Ex. 21 | 41 | 71 | 1.73 | 0/80 | 0/10 |
| Ex. 22 | 42 | 89 | 2.12 | 0/80 | 0/10 |
| Ex. 23 | 33 | 79 | 2.39 | 0/80 | 0/10 |
| Ex. 24 | 59 | 81 | 1.37 | 0/80 | 0/10 |

As shown in Table 6, when the average area ratio A1 (A2) of the conductor 61 in each region was within a predetermined range, the plating property and the joint reliability of the baked electrode layer 6a were further improved.

DESCRIPTION OF THE REFERENCE NUMERICAL

2 . . . multilayer ceramic capacitor
   4 . . . element body
      4a . . . end surface
      4b . . . side surface
         10 . . . ceramic layer
         12 . . . internal electrode layer
      14 . . . boundary layer
6 . . . external electrode
   6a . . . baked electrode
      6a1 . . . first region
      6a2 . . . second region
         61 . . . conductor
         62 . . . non-metal component
            621 . . . glass frit
            622 . . . high-melting-point oxide
   6ab . . . outer surface (boundary between baked electrode and plating electrode layer)
   6b . . . plating electrode layer
      6b1 . . . Ni plating layer
      6b2 . . . Si plating layer
46 . . . joint boundary

What is claimed is:

1. A ceramic electronic device comprising:
an element body including a ceramic layer and an internal electrode layer; and
an external electrode formed on an end surface of the element body and electrically connected to at least one end of the internal electrode layer,
wherein
the ceramic layer comprises a perovskite compound represented by $ABO_3$ as a main component,
the external electrode comprises a baked electrode layer,
the baked electrode layer comprises:
a first region contacted with the end surface of the element body and located near a joint boundary with the element body; and
a second region located outside the first region and constituting an outer surface of the baked electrode layer,
the first region comprises a glass frit including at least B, Zn, and Si, and
the second region comprises an oxide having a higher melting point than Cu, wherein the glass frit contained in the first region comprises:
a Zn content of 0.20 parts by mol to 0.35 parts by mol;
a Si content of 0.10 parts by mol to 0.30 parts by mol; and
a remainder of B,
provided that a total of the B content, the Zn content, and the Si content is 1 part by mol.

2. The ceramic electronic device according to claim 1, wherein the oxide contained in the second region is $Zn_2SiO_4$.

3. The ceramic electronic device according to claim 1, wherein an area ratio of a conductor in the first region is 30% to 60% in a cross section of the baked electrode layer.

4. The ceramic electronic device according to claim 1, wherein an area ratio of a conductor in the second region is 70% to 90% in a cross section of the baked electrode layer.

5. A ceramic electronic device comprising:
an element body including a ceramic layer and an internal electrode layer; and
an external electrode formed on an end surface of the element body and electrically connected to at least one end of the internal electrode layer,
wherein
the ceramic layer comprises a perovskite compound represented by $ABO_3$ as a main component,
the external electrode comprises a baked electrode layer,
the baked electrode layer comprises:
a first region contacted with the end surface of the element body and located near a joint boundary with the element body; and
a second region located outside the first region and constituting an outer surface of the baked electrode layer,
the first region comprises a glass frit including at least B, Zn, and Si, and
the second region comprises an oxide having a higher melting point than Cu,
the oxide contained in the second region includes Zn and Si as a main component, and
a molar ratio (Zn/Si) of a Zn content to a Si content in the oxide is 1.5 to 2.4.

6. A ceramic electronic device comprising:
an element body including a ceramic layer and an internal electrode layer; and
an external electrode formed on an end surface of the element body and electrically connected to at least one end of the internal electrode layer,
wherein
the ceramic layer comprises a perovskite compound represented by $ABO_3$ as a main component,
the external electrode comprises a baked electrode layer,
the baked electrode layer comprises:
a first region contacted with the end surface of the element body and located near a joint boundary with the element body; and
a second region located outside the first region and constituting an outer surface of the baked electrode layer,
the first region comprises a glass frit including at least B, Zn, and Si, and
the second region comprises an oxide having a higher melting point than Cu,
a boundary layer is present at an end of the ceramic layer to be contacted with the external electrode on the end surface of the element body, and
the boundary layer includes Zn, Si, and an A-site element of the perovskite compound.

7. The ceramic electronic device according to claim 6, wherein the boundary layer comprises:
an A-site element content of 0.3 parts by mol to 0.45 parts by mol;
a Zn content of 0.15 parts by mol to 0.45 parts by mol; and
a remainder of Si,
provided that a total of the Zn content, the Si content, and the A-site element content is 1 part by mol.

8. The ceramic electronic device according to claim 6, wherein a main component of the boundary layer is $(Ca,Sr)_2Zn(Si_2O_7)$.

* * * * *